United States Patent [19]

Rothenberger

[11] Patent Number: 4,763,413
[45] Date of Patent: Aug. 16, 1988

[54] CHAIN TUBE CUTTER

[76] Inventor: Günter Rothenberger, Landgraf-Friedrich-Strasse 21, D-6380 Bad Homburg, Fed. Rep. of Germany

[21] Appl. No.: 22,495

[22] Filed: Mar. 4, 1987

Related U.S. Application Data

[63] Continuation of Ser. No. 191,228, Sep. 26, 1980, abandoned.

[30] Foreign Application Priority Data

Oct. 11, 1980 [DE] Fed. Rep. of Germany ....... 7928923

[51] Int. Cl.⁴ .......................................... B23D 21/06
[52] U.S. Cl. ........................................ 30/94; 30/100; 30/95
[58] Field of Search ................ 30/92, 93, 94, 95, 100; 81/411, 412, 418

[56] References Cited

U.S. PATENT DOCUMENTS

| | | | |
|---|---|---|---|
| 295,885 | 3/1884 | Pullman | 81/412 |
| 1,529,489 | 3/1925 | Leipold | 30/94 |
| 1,643,835 | 9/1927 | Carlson | 81/412 |
| 2,243,086 | 5/1941 | Buettell | 81/412 |
| 2,483,380 | 9/1949 | Duffy | 81/412 |
| 2,793,433 | 5/1957 | Wheeler | 30/100 |
| 3,564,711 | 2/1971 | McFarland | 30/100 |

Primary Examiner—Frederick R. Schmidt
Assistant Examiner—Maurina Rachuba
Attorney, Agent, or Firm—Felfe & Lynch

[57] ABSTRACT

A chain tube cutter has two plier-like levers with hand grips on one side of a pivot pin which projects from one lever through a slot in the other and chain-engaging arms on the other side of the pivot pin. A link cutting chain is secured to one arm. The other arm has notches for engaging a selected link of the chain after it is wrapped around the tube to be cut. Squeezing the hand grips together generally keeps the chain adjusted about the tube as it is cut by rotating the cutter relative to the tube, but to provide greater initial and operational adjustment, the pivot pin is variably positionable in the slot.

5 Claims, 1 Drawing Sheet

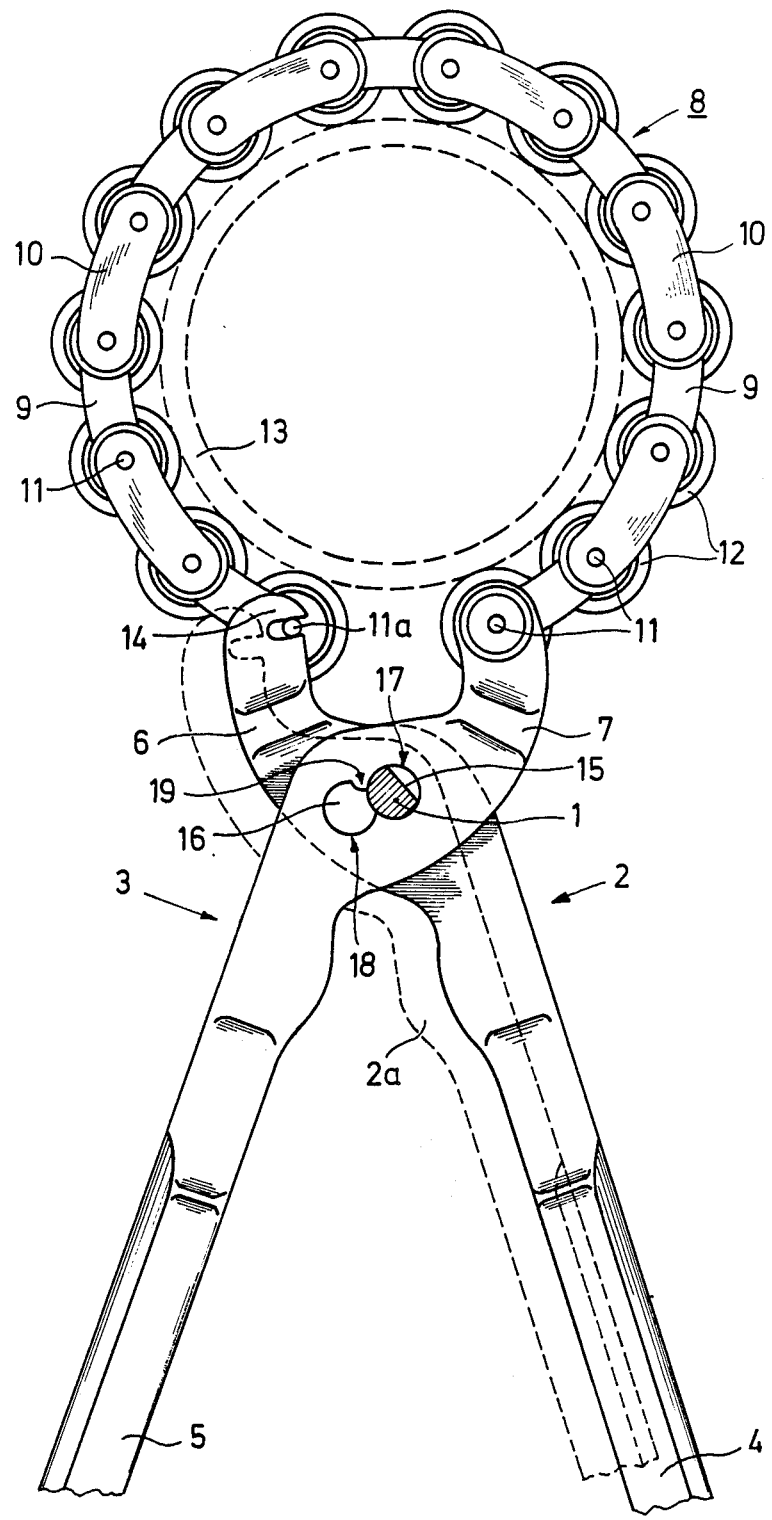

CHAIN TUBE CUTTER

This application is a continuation of application Ser. No. 191,228, filed Sept. 26, 1980, abandoned.

BACKGROUND OF THE INVENTION

The invention relates to a chain tube cutter comprising two levers relatively pivotable on a pivot pin, hand grips on one side of the pivot and, on the other side, arms, and a linked chain with cutting rollers carried on link pins which is pivoted, but not readily removable from one arm and selectably engaged two forks on the other arm at different link pins.

Such a chain tube cutter can be used on a number of different tube diameters and materials such as metal, plastic, etc. For the purpose of adjustment to a different tube diameter, the link pin notched into the forks on the one plier arm is taken out and another link pin notched in its place. By squeezing together the two plier levers, the chain and the cutting rollers are tensioned around the tube so that by twisting, especially twisting to-and-fro, a clean separation of the tube is effected. Because of the necessarily quite coarse pitch of the linked chain, occasioned by the diameter of the cutting rollers, and hence the spacing of the link pins, known chain tube cutters have only a coarse adjustability. This means that with a substantial number of tube diameters, the plier levers have to be spread wide apart at the start of the cutting process which does not allow the optimum application of force. If the next wider spaced link pin is notched in the forks, the plier levers can certainly be put in an advantageous relative position at the beginning of the cutting process, but then it can happen—especially with thick-walled tubes—that the cutting process cannot be carried through to the end, because the plier levers have closed.

SUMMARY OF THE INVENTION

The invention is based on the problem of improving a chain tube cutter of the kind referred to above so that the plier levers, at the start of a cutting operation can be adjusted sufficiently for optimum use.

The solution of this problem is effected in the above-described chain tube cutter in accordance with the invention in that the one plier lever together with the pivot pin is held in the other plier lever so that it is adjustable transversely thereof.

The extent of the resulting adjustment is particularly useful if it is about half the spacing of the link pins. In this way, it is usually possible to have a nearly optimum pre-adjustment of the plier levers. This gives the possibility of single handed operation of the pliers, so that the user has his other hand free, for example to hold the tube to be cut.

It is particularly advantageous if the pivot pin has a non-circular cross-section, is fixed in one plier lever, and is locatable on either side of an approximately figure "8" shaped slot in the other plier lever, the longest axis of the slot running across the plier lever. The cross-section of the pivot pin has, usefully, the form of a segment of a circle which amounts to more than half a circle cross section and passes through a constricted nose in the slot "8", that is to say the two laterally displaced circular arcs between which is arranged the nose, with the plier levers open.

BRIEF DESCRIPTION OF THE DRAWING

One embodiment of the invention will now be more particularly described with reference to the single FIGURE which is a front view thereof.

DETAILED DESCRIPTION OF THE INVENTION

In the FIGURE, a chain tube cutter is described which comprises two plier levers 2 and 3 pivotable on a pivot pin 1. The plier levers form on one side hand grips 4 and 5, and on the other side, arms 6 and 7, with parts with even and odd reference numerals belonging together. The plier levers are offset as shown, so that by squeezing together the hand grips 4 and 5, the arms 6 and 7 move towards each other. A linked chain 8 is fastened on arm 7 which comprises links 9 and 10 arranged in two rows which are pivotally connected together by link pins 11. On the link pins 11, cutting rollers 12 are rotatably carried.

The chain 8 surrounds the major part of a tube 13. At its other end, the link pin 11a is notched in two forks 14 which straddle the chain 8 on both sides symmetrically, and of which, in the FIGURE, only the forwardmost one is visible. The forks 14 form the end of the (doubled) arm 6. It is to be understood that it does not have to be the last link pin 11a that is notched in the forks 14, but that, with correspondingly smaller tube diameters, most of the other link pins can be notched in the forks 14, so that a part of the chain hangs out to the side of the arm 6. The pivot pin 1 is fixed, that is to say neither rotatable nor displaceable in the plier lever 2 and, where it projects through the pivot lever 3, has a non-circular cross-section, shown as a hatched region, which is a segment of a circle larger than a semi-circle. The chord 15 runs substantially parallel to the handgrip 4. The plier lever 2 fits around the plier lever 3 and is flattened at this point.

A slot 16 is arranged with a periphery made up of two nearly completely circular arcs 17 and 18. In the passage between the circular arcs there is at least at one side a constricting nose 19, which so limits the cross-section of the slot at this point that the pivot pin 1 can be slid through to the other side of the nose 19 only in position of its smallest cross-section normal to the chord 15.

It is seen that the pivot pin 1 can be freely rotated in the shown position in the right hand part of the slot 16. By widely spreading the two plier levers, however, the pivot pin 1 can be slid to the left hand side of the slot 16, that is to say behind the nose 19, and is there likewise freely rotatable to an adequate extent. The plier lever 2 can thus be brought into the position 2a shown in broken line from which a cutting operation can start.

I claim:

1. A chain tube cutter with a cutting chain having links, cutting rolls and link pins and a pair of plier levers for cutting a tube diameter by surrounding the tube diameter with the tube cutter and notching a link pin into place to preadjust the cutter about the tube diameter and to operate the cutter in a single-handed operation to cleanly separate tube parts before the plier levers close together, the tube cutter comprising:

(a) a cutting chain having links, cutting rollers, and link pins axially extending from the cutting rollers and rotatably extending into oppositely-disposed pairs of the links to assemble the links into the cutting chain with the cutting rollers rotatably supported therein; and (b) a pair of plier levers, each lever having a hand grip at one end and a chain-engaging arm at the other end, one of the chain-engaging arms being connected to the cutting chain and the other having means for notching onto a selected one of the link pins to encircle the tube to be cut with the chain links between the arms, one of the plier levers having a pivot pin projecting therefrom and the other plier lever having a slot means for pivotally receiving the pivot pin in spaced positions on the plier lever, whereby the pin pin is first positioned in the slot for adjusting the cutting chain about the tube to be cut and the plier levers are then pivoted for the same, the combination of the positioning and pivoting of the plier levers with the pivot pin and slot providing greater adjustment to the cutter, and said pivot pin having a transverse adjustment in the slot means corresponding to half the spacing of the link pins to preadjust the chain tube cutter about the tube diameter without spreading the plier levers widely apart and to operate the cutter in a single-handed operation providing a clean separation of tube parts before the plier levers close together and without further adjustment by a user's second hand.

2. A chain tube cutter with a cutting chain having links, cutting rolls and link pins and a pair of plier levers for cutting a tube diameter by surrounding the tube diameter with the tube cutter and notching a link pin into place to preadjust the cutter about the tube diameter and to operate the cutter in a single-handed operation to cleanly separate tube parts before the plier levers close together, the tube cutter comprising:

(a) a cutting chain having links, cutting rollers, and link pins axially extending from the cutting rollers and rotatably extending into oppositely-disposed pairs of the links to assemble the same into the cutting chain with the cutting rollers rotatably supported therein; and (b) a pair of plier levers, each lever having a hand grip at one end and a chain-engaging arm at the other end, one of the chain-engaging arms being connected to the cutting chain and the other having means for notching onto a selected one of the link pins to coarsely adjust the chain tube cutter about a tube to be cut, and one of the plier levers having a pivot pin projecting outward in an axial direction relative to the plier levers, said pivot pin having a non-circular cross-section, and the other plier lever having a slot means for pivotally receiving the pivot pin in a first spaced position on the plier lever to coarsely adjust the cutting chain about the tube to be cut and for pivotally receiving the pivot pin in a second spaced position on the plier lever to provide finer adjustment of the cutter about the tube to be cut, the pivot pin having a transverse adjustment in the slot corresponding to half the spacing of the link pins to preadjust the chain tube cutter about the tube diameter without spreading the plier levers widely apart and to operate the cutter in a single-handed operation providing a clean separation of tube parts before the plier levers close together and without further adjustment by a user's second hand.

3. A chain tube cutter according to claim 2, wherein the slot means comprises a substantially figure-eight shaped slot in the other plier lever having the longest axis of the slot extending in a direction across the plier lever; and a constricting nose approximately centered in the slot and passed on one side by the pivot pin when the plier levers open.

4. The chain tube cutter according to claim 2, wherein the plier levers comprise sheet metal.

5. A chain tube cutter with a cutting chain having links, cutting rolls and link pins and a pair of plier levers for cutting a tube diameter by surrounding the tube diameter with the tube cutter and notching a link pin into place to preadjust the cutter about the tube diameter and to operate the cutter in a single-handed operation to cleanly separate tube parts before the plier levers close together, the tube cutter comprising:

(a) a cutting chain having links, cutting rollers, and link pins axially extending from the cutting rollers and rotatably extending into oppositely-disposed pairs of links to assemble the same into the cutting chain with the cutting rollers rotatably supported therein; and (b) a pair of plier levers, each lever having a hand grip at one end and a chain-engaging arm at the other end, one of the chain-engaging arms being connected to the cutting chain and the other having means for notching onto a selected one of the link pins to coarsely adjust the chain tube cutter about a tube to be cut, and one of the plier levers having a pivot pin projecting outward in a axial direction relative to the plier levers, said pivot pin having a non-circular cross-section, and the other plier lever having a slot means for pivotally receiving the pivot pin in a first spaced position on the plier lever to coarsely adjust the cutting chain about the tube to be cut and for pivotally receiving the pivot pin in a second spaced position on the plier lever to provide finer adjustment of the cutter about the tube to be cut, the slot means comprises a substantially figure-eight shaped slot in the other plier lever having the longest axis of the slot extending in a direction across the plier lever, and a constricting nose approximately centered in the slot and passed on one side by the pivot pin when the plier levers open, the pivot pin having a transverse adjustment in the slot corresponding to half the spacing of the link pins to preadjust the chain tube cutter about the tube diameter without spreading the plier levers widely apart and to operate the cutter in a single-handed operation providing a clean separation of tube parts before the plier levers close together and without further adjustment by a user's second hand.

* * * * *

UNITED STATES PATENT AND TRADEMARK OFFICE
CERTIFICATE OF CORRECTION

PATENT NO. : 4,763,413

DATED : August 16, 1988

INVENTOR(S) : Günter Rothenberger

It is certified that error appears in the above-identified patent and that said Letters Patent is hereby corrected as shown below:

Column 1, line 9, change "two levers" to --two plier levers--.

Column 1, line 13, change "engaged two forks" to --engaged (notched) by two forks--.

Column 1, line 41, change "impnroving" to --improving--.

Column 3, line 13, new claim 1, change "whereby the pin pin" to --whereby the pivot pin--.

Signed and Sealed this

Eleventh Day of April, 1989

*Attest:*

DONALD J. QUIGG

*Attesting Officer*     Commissioner of Patents and Trademarks